United States Patent [19]

Young

[11] Patent Number: 5,080,717
[45] Date of Patent: Jan. 14, 1992

[54] FLUID SUSPENSIONS OF POLYSACCHARIDE MIXTURES

[75] Inventor: Teng-Shau Young, Wilmington, Del.

[73] Assignee: Aqualon Company, Wilmington, Del.

[21] Appl. No.: 645,549

[22] Filed: Jan. 24, 1991

[51] Int. Cl.$^5$ .......................................... C09D 101/28
[52] U.S. Cl. ............................... 106/197.1; 106/197.2; 106/157; 106/158; 106/780; 524/27; 524/43; 524/44; 524/46
[58] Field of Search .................. 106/188, 197.1, 197.2, 106/157, 158, 780; 162/177; 524/27, 43, 44, 46

[56] References Cited

U.S. PATENT DOCUMENTS 4,313,765  2/1982  Baird et al. ...................... 106/197.2
4,558,079  12/1985  Desmarais ....................... 106/197.1

FOREIGN PATENT DOCUMENTS 61-085482  5/1986  Japan .
63-008467  1/1988  Japan ................................ 106/197.2

Primary Examiner—Theodore Morris
Assistant Examiner—David M. Brunsman
Attorney, Agent, or Firm—James K. Luchs

[57] ABSTRACT

A nonionic cellulose ether such as hydroxyalkylcellulose, alkylcellulose or an alkylhydroxyalkylcellulose hydrophobically modified with a $C_4$ to $C_{24}$ alkyl or an arylalkyl group is suspended by a low molecular weight polysaccharide and below 10% by weight salt to provide a fluidized polymer suspension. The process for manufacture involves preparing an aqueous polysaccharide solution and adding a nonionic cellulose ether while stirring. Anionic, nonionic and cationic suspending polymers such as CMC, CM Guar, HEC and cationic starch may be used. Sodium carbonate is a preferred salt.

4 Claims, No Drawings

FLUID SUSPENSIONS OF POLYSACCHARIDE MIXTURES

FIELD OF THE INVENTION

The invention relates to aqueous fluid suspensions of polymeric thickeners. In particular the invention relates to the use of fluidized suspensions of polysaccharide mixtures in paper coating compositions.

BACKGROUND OF THE INVENTION

U.S. Pat. Nos. 4,799,962, 4,883,536 and 4,883,537 disclose aqueous fluid mixtures and suspension containing polyethylene oxides or salts. U.S. Pat. No. 4,154,899 describes the use of pigment, clay and modified starch ether for coating compositions which are applied to paper during manufacture. European Patent Application EP 307-795 describes a pigment dispersion used for paper coating which can contain modified starch, galactomannan, methylcellulose (MC) or carboxymethylcellulose (CMC). A quaternary starch ether is employed in the papermaking method of U.S. Patent 4,840,705.

It is further known from Aqualon ® publication 250-IIC, Natrosol ®—Hydroxyethylcellulose—A Nonionic Water-Soluble Polymer—Physical and Chemical Properties, that this cellulosic can be used in coating colors and size press solutions to control water binding, solids holdout and rheology. Hercules Incorporated product data publication 456-2, Natrosol ® R in Pigmented Coatings for Paper and Paperboard, contains viscosity data useful for selection of a grade of product for a papermaking application.

U.S. Pat. Nos. 4,834,207, 4,228,277 and 4,243,802 describe hydrophobically modified hydroxyethylcellulose (HMHEC) for use in latex paints and shampoos. Chain lengths from $C_4$ to $C_{24}$ can provide the hydrophobic modification.

Still it remained for the present invention to teach how two or more anionic and nonionic polysaccharides provide a fluid suspension applicable for paper manufacture.

SUMMARY OF THE INVENTION

It is an object of the invention to provide an aqueous fluidized polymer suspension comprising at least one low molecular weight polysaccharide and at least one nonionic cellulose ether polymer with a salt content below 10% by weight wherein the suspension remains fluid and pourable.

It is preferred for paper coatings that the nonionic cellulose ether polymer be a water soluble hydrophobically modified alkylcellulose, alkylhydroxyalkylcellulose or hydroxyalkylcellulose.

A process for preparing a fluidized polymer suspension involves the steps:

(1) preparing an aqueous solution of a low molecular weight polysaccharide containing up to 10% by weight ammonium or alkali salt from the group of carbonate, sulfate, phosphate or formate; and (2) stirring the solution while adding a nonionic cellulose ether to prepare a fluidized polymer suspension.

An anionic cellulose and hydrophobically modified cellulose ether mixture can be added as a sole thickening agent or be used in combination with other thickening agents for paper coating compositions. Sodium carboxymethylcellulose is a preferred anionic polymer and hydrophobically modified hydroxyethylcellulose is a preferred nonionic cellulose ether polymer.

DETAILED DESCRIPTION OF THE INVENTION

This invention is concerned with fluid aqueous suspensions comprising at least two water-soluble polysaccharides that possess distinct properties. One of the polysaccharides in the Multi-Polysaccharide Suspension (MPS) is of a relatively low molecular weight (MW) and is dissolved in the continuous aqueous phase. One or more nonionic cellulosic polymers is present in a form of dispersed particles in the suspension. The suspension either contains no added salt or a relatively low level of inorganic salt or mixture thereof (less than 10 wt. %). The suspensions typically have a total polysaccharide concentration of 20 wt. % or higher, and are fluid and pourable. All of the Multi-Polysaccharide Suspensions (MPSs) described herein can be readily dispersed and dissolved in aqueous solvent.

The continuous aqueous phase of the MPS contains a dissolved low-MW polysaccharide, an inorganic salt at a concentration of 0 (salt-free) to 8 wt. % (low-salt), and minor amounts of additives (less than 1 wt. %) which may include defoamer, dispersant, preservative, and/or suspension stabilizers such as xanthan gum. The dissolved low-MW polysaccharide can be a CMC (anionic, e.g., Ambergum ® 1570 or Ambergum ® 3021), a hydroxyethylcellulose (HEC) (nonionic, e.g., AQU-D3097), a degraded carboxymethyl guar (anionic, e.g., AQU-D3144), all of which are available from the Aqualon Company, and a starch derivative (cationic starch such as Amaizo ® 2187). These dissolved low-MW polysaccharides generally have a solution viscosity of less than 10,000 mPa.s as measured at a concentration of 15 wt. % using a Brookfield viscometer at 12 rpm. The inorganic salt (or salt mixture) for use in the preparation of the referred suspensions may be sodium formate, sodium carbonate, sodium sulfate, potassium carbonate, diammonium phosphate, or others.

The dispersed phase contains one or more Dispersed, Nonionic Cellulosic Polymer (DNCP). The DNCP can be a hydroxypropylcellulose (e.g., Klucel ® HPC), methylcellulose or methylhydroxypropylcellulose (e.g., Culminal TM MC or Benecel TM MHPC), methylhydroxyethylcellulose (e.g., Culminal TM or Benecel TM MHEC), hydrophobically modified hydroxyethylcellulose (e.g., Natrosol ® Plus 330 HMHEC), or hydroxyethylcellulose (e.g., Natrosol ® HEC). Insolubilization of the DNCP, which is less hydrophilic than the dissolved polysaccharide, is primarily a result of the difference in water solubility between the dissolved polysaccharide and the DNCP. Further reduction in DNCP swelling or dissolution, where necessary, may be attained by dissolving in the aqueous phase a relatively small amount of salt, which helps reduce the amount of water accessible to the DNCP. The dissolved polysaccharide also causes an increase in the liquid phase viscosity, which reduces the rate of settlement of the suspended polymer particles and, hence, improves suspension stability.

A MPS can be prepared by adding a DNCP to a vigorously agitated solution of the low-MW polysaccharide in which an amount of inorganic salt (or salts) at a concentration of 0 to 8 wt % has been previously added. A fluid suspension is obtained after the mixture is stirred for a period of 15 to 60 minutes. A small amount of additives such as defoamer, dispersant, or suspension stabilizer may be added if necessary. Additives such as defoamer may be added before or after the DNCP has been dispersed into the aqueous solution.

The suspensions can be readily pumped and redissolved in aqueous media; the dissolution of the suspension is substantially faster than that of the nonionic cellulosic polymer. These properties can lead to a significant improvement in the efficiency of polymer solution makeup operations, and reduce or eliminate difficulties often associated with handling of dry powders of cellulosic polymers, such as powder dusting and lumping of wet particles during mixing.

This invention is intended to introduce (1) a new methodology of preparing easily processable suspensions of cellulosic polymers that contain a relatively low level of added salt, and (2) a means to produce uniform mixtures of cellulosic polymers which can provide different functionalities in a certain application.

The MPSs are of use in various applications where one of the following conditions exist:

(a) Each of the different polysaccharides in the suspension imparts essential functionality to the end application;

(b) The DNCP (suspended polymer) is primarily responsible for the key functionality; the dissolved polysaccharide allows (1) suspending of the functional DNCP without using a high level of salt (high salt level not tolerated in concerned application); (2) fast and ready dissolution of the suspended polymer; and/or (3) other desirable properties that are not critical to the end application, such as added thickening/water holding or improved particle dispersion (as protective colloid in the end formulation).

In common with other industries the paper and paperboard manufacturers seek to improve productivity and lower mill cost. One of the problems limiting their productivity has been the necessity to employ solid thickeners in preparing suitable coating compositions.

Ideally, a paper coating thickener/co-binder should bring about desired rheological properties that allow easy mixing, pumping and recycling, and, most importantly, proper metering of the pigmented coating. It should also lead to a coating structure which is less prone to water loss when in contact with paper web during the coating operation. A suitable combination of coating rheology and water retention capability then leads to well-controlled coat weight and good coater runnability. An ideal thickener/co-binder should also impact the coating structure in such a way that coated paper properties such as gloss, opacity, and coating strength may be enhanced. Moreover, there is an increasing need for thickeners/co-binders in a fluid liquid form to facilitate rapid, automated coating preparation in today's high speed coating operations.

Cellulosic derivative such as CMCs have been known for years to be effective as paper coating thickeners. As derivatives of cellulose, they have inherent affinity towards the paper substrate upon which the pigmented coating is placed. This nature, together with their water binding property and long chain structure, is largely responsible for their effectiveness as thickeners/co-binders. However, the ever increasing demands for increased coating speed and enhanced coating properties call for new products that can simultaneously provide several different but essential functions. These demands sometimes cannot be satisfied with one single cellulosic polymer, and a product consisting of more than one cellulosic derivative, such as MPS, is needed. The following illustrates how the MPSs HMHEC/CMC and HMHEC/MC/CMC suspensions meet the current needs for liquid products and various essential coating properties.

The inclusion of more than one cellulosic polymer with distinct properties in the suspension makes it possible to attain a combination of desirable coating properties that are not readily obtainable from a single polymer. For instance, a HMHEC has been shown to give a combination of strong low-shear coating structure, which helps reduce penetration of coating into the paper substrate, and low flow resistance under high shear conditions typical of blade metering at high coating speeds. It also gives generally high thickening efficiency, which means only a relatively low dosage is required to thicken the coating to a certain target viscosity, by virtue of its self-associating nature. These properties make the HMHEC an effective light-weight coating (LWC) for papers. However, when a HMHEC is used as the sole thickener/co-binder in a clay-containing coating formulation, its highly clay adsorbing nature often results in a relatively low aqueous liquid viscosity, and hence a somewhat limited water retention capability (indicated by a relatively short water retention time for the coating). Improvement in water retention capability may be achieved by using a MPS also consisting of a CMC.

Suspensions can be readily dispersed and dissolved in a large mass of aqueous liquid. Thus, they can be added to the pigmented coating at different stages of the mixing process, making them adaptable to various coating preparation conditions. This nature makes the MPSs suitable for highly automated coating preparation processes.

It was a surprising result to find how efficient the composition and process of the invention were in meeting the aims of the paper industry. Uniform paper surfaces can be produced using a MPS as the thickener. Higher productivity can be achieved without sacrifice of quality or significantly increasing costs using the low salt combination of anionic and nonionic cellulosic polymer.

Cellulosic thickening agents having suitable hydrophobic modification are available from the Aqualon Company. A preferred modified cellulosic is Natrosol® Plus HMHEC. An Aqualon publication, Natrosol® Plus 250-18A, describes how this material functions as an associative thickener in paint, but gives no suggestion of the present invention.

A suitable low molecular weight polysaccharide is carboxymethylcellulose (CMC), available from Aqualon Company as Ambergum® 1570 or Ambergum® 3021. However, the suspending polymer is not limited to anionic materials since low molecular weight nonionics such as hydroxyethylcellulose (HEC) or cationics, such as Amaizo® 2187 available from American Maize, may also be used in the practice of the invention.

The suspending polymer (low molecular weight polysaccharide), whether anionic, nonionic or cationic, must be available in a state such that a 15% by weight solution gives a Brookfield viscosity at room temperature below 10,000 mPa.s.

Depending upon the needs of the paper manufacturer, it may be desirable to use one or more hydrophobically modified cellulosics in combination with one or more anionic cellulosics such as CMC. Similarly other low molecular weight polysaccharides, such as hydroxyethylcellulose (HEC), carboxymethylguar (CM Guar) or starch derivatives, can be used as the dispersing medium for other cellulosic polymers such as methylcellulose (MC), methylhydroxyethylcellulose (MHEC), methylhydroxypropylcellulose (MHPC), hydroxypropylcellulose (HPC) or hydroxyethylcellulose (HEC).

Typical ingredients for paper coating compositions in addition to thickeners include: pigments (e.g., kaolin clay, calcium carbonate, gypsum, titanium dioxide, etc.), polymeric binder (e.g., styrene-butadiene latex, protein, starch, etc.), lubricants such as glycols and fatty acids, insolubilizers and defoamers. Once prepared as a coating composition, it is usual practice in the industry to measure viscosity and rheology properties of the composition prior to an actual test of the composition. In this way a body of knowledge is built up by comparison of such results with the actual quality and reproduceability provided by any of the compositions tested.

In addition to paper coating, it is possible to find uses for MPSs in the areas of latex paints, food, pharmaceutical, personal care, and others. In these applications, the polysaccharides involved in the MPS are normally employed to provide viscosity, rheology control, water retention, and/or formulation stability. The low salt content of the invention can be highly desirable since adverse effects of salt on the colloid chemistry of the concerned formulation may be minimized. With little or no added salt in the polysaccharide suspension, health concerns due to salt content will be minimal. Thus a salt-free or low-salt MPS of HPC, MC, or MHPC can be used in food and personal care products.

Examples 1 to 8 describe the compositions and physical properties of various types of MPSs. Total polymer concentration of these MPSs range from 20 to 30 wt. %. The weight ratio of DNCP to dissolved polysaccharide ranges from 2.1 to 0.5. The pH values vary from 6.2 to 10.7. Brookfield viscosities measured at 6 rpm fall between 700 and 12,000 mPa.s (cPs). Example 9 illustrates the use of MPS as thickeners/co-binders in paper coating formulations.

Example 1

Salt-Free Suspension Containing HPC and CMC

This example illustrates the preparation of a fluid suspension of hydroxypropylcellulose (HPC) in a solution of sodium carboxymethylcellulose (CMC). The composition of this MPS is given in Table 1. It was prepared by adding the fine HPC powders into a vigorously agitated CMC solution, followed by continued mixing for approximately 30 minutes. Minor amounts of defoamer and suspension stabilizer (xanthan gum) were predissolved in the CMC solution before the addition of HPC powders.

The resulting MPS was found to dissolve in aqueous media significantly faster than the corresponding dry HPC product. The time required for the suspension to attain 90% of its equilibrium solution viscosity in cold water was ca. 10 minutes, compared to over one hour for the dry HPC. Since this composition does not contain any added salt, it may be used as thickener, binder, or process aid in personal care, food, pharmaceutical, and other products, where a high level of salt can cause health concerns.

The low-MW CMC used in this example was supplied as a solution product which had a solution viscosity of ca. 1000 mPa.s at a concentration of 15 wt. %.

The Klucel ® hydroxypropylcellulose (HPC) and the CMC solution product, with a trade name of Ambergum ® 1570, are both available from Aqualon. The defoamer, Hercules DF 285, is available from Hercules Incorporated. The xanthan gum was obtained from Kelco. All the suspension viscosities given in this and the following examples were measured using a Brookfield LVT viscometer at a rotating speed of 6 rpm, and are reported in mPa.s (cPs).

TABLE 1

| Composition of Salt-Free MPS Containing Hydroxypropylcellulose and CMC | |
|---|---|
| HPC, Klucel ® HXF | 12.0 |
| CMC, in Ambergum ® 1570 | 12.0 |
| Defoamer, Hercules DF 285 | 0.2 |
| Xanthan Gum, Kelzan ® S | 0.4 |
| Methyl parasept (preservative) | 0.1 |
| Water | 75.3 |
| pH | 6.2 |
| Viscosity | 6100 |
| Wt. % polysaccharide | 24.4 |

Example 2

Suspending a HMHEC in a CMC Solution

A MPS containing a hydrophobically-modified hydroxyethylcellulose (HMHEC) and a low-MW CMC was prepared as described in Example 1. An amount of inorganic salt at a level up to 7 wt. % was added to the composition to supplement the low-MW CMC in insolubilizing the HMHEC. Small amounts of defoamer and preservative (methyl parasept) were also added to help maintain the suspension stability. The HMHEC and CMC used in this example are available from Aqualon Company The MPS was made by (1) preparing an aqueous solution which contained predetermined amounts of CMC and methyl parasept, (2) dissolving the salt in the aqueous solution, which took ca. 20 to 30 minutes, (3) gradually adding the dry HMHEC solids into the aqueous solution which was under vigorous agitation, and (4) adding the defoamer. The resulting suspension was then mixed for ca. 30 minutes to ensure uniform dispersion. Typical pH and Brookfield viscosity values for the suspensions are given in Table 2.

TABLE 2

| Compositions of MPSs Containing HMHEC and Low-MW CMC | | | | |
|---|---|---|---|---|
| | 2-A | 2-B | 2-C | 2-D |
| HMHEC, Natrosol ® Plus 330 | 10.0 | 14.0 | 10.0 | 10.0 |
| CMC, in Ambergum ® 1570 | 10.0 | 6.0 | 10.0 | 10.0 |
| Sodium carbonate | 5.0 | 6.2 | — | — |
| Sodium sulfate | — | — | 7.0 | — |
| Diammonium phosphate | — | — | — | 7.0 |
| Defoamer 285 | 0.2 | 0.2 | 0.2 | 0.2 |
| Methyl Parasept | 0.1 | 0.1 | 0.1 | 0.1 |
| Water | 74.7 | 73.5 | 72.7 | 72.7 |
| pH | 10.3 | 10.1 | 6.9 | 7.6 |
| Viscosity | 8400 | 4000 | 9300 | 5400 |
| Wt. % polysaccharide | 20.0 | 20.0 | 20.0 | 20.0 |

MPSs of this type have been shown to be useful in paper coating applications. The use of a HMHEC/CMC MPS as a paper coating thickener/co-binder is illustrated in Example 9.

Example 3
Suspending a MC or MC Derivative in a CMC Solution

This example describes the preparation of MPSs containing a low-MW CMC (as described in Example 1) and a methylcellulose or a methylcellulose derivative such as methylhydroxypropylcellulose (MHPC) or methylhydroxyethylcellulose (MHEC).

TABLE 3

| Compositions of MPSs Containing CMC and MC, MHPC, or MHEC | | | |
|---|---|---|---|
| | 3-B | 3-C | 3-D |
| MC, Culminal ® 400 | 10.0 | — | — |
| MHPC, Benecel ™ MP943W | — | — | 11.0 |
| MHEC, Culminal ® C3033 | — | 10.0 | — |
| CMC, in Ambergum ® 1570 | 10.0 | 10.0 | 11.0 |
| Sodium carbonate | 2.0 | 2.0 | — |
| Sodium sulfate | — | — | 3.5 |
| Hercules DF 285 | 0.2 | 0.2 | 0.2 |
| Xanthan Gum, Kelzan ® S | 0.2 | 0.2 | 0.4 |
| Methyl parasept | 0.1 | 0.1 | 0.1 |
| Water | 77.5 | 77.5 | 73.8 |
| pH | 10.3 | 10.3 | 6.7 |
| Viscosity | 4900 | 5500 | 9100 |
| Wt. % polysaccharide | 20.2 | 20.2 | 22.4 |

These MPSs also demonstrated faster dissolution in aqueous media than the corresponding dry MC, MHEC, or MHPC. For instance, the time required for MPS 3-C (Table 3) to attain 90% of its equilibrium viscosity was less than five minutes, in comparison to about 40 minutes for the dry Benecel ™ MHEC product. With the relatively low salt contents, such MPSs may find commercial use in personal care and paper coating applications.

Example 4
HEC Suspended in CMC Solutions

The following MPSs demonstrate the feasibility of preparing fluid suspensions that contain a hydroxyethylcellulose (HEC) and a low-MW CMC. The procedure for preparing the MPSs is similar to that described in Example 1. A CMC with a very low MW, which gave a solution viscosity of about 1000 cPs at a concentration of 30 wt. %, was used in this example. This low MW CMC is available as a solution product (Ambergum ® 3021) from Aqualon Company. The HEC products are also available from Aqualon.

TABLE 4

| MPSs Containing a Suspended HEC and Dissolved CMC | | | |
|---|---|---|---|
| | 4-B | 4-C | 4-D |
| HEC, Natrosol ® 250 GR | 10.0 | — | — |
| HEC, Natrosol ® 250 MXR | — | 10.0 | — |
| HEC, Natrosol ® 250 HBR | — | — | 10.0 |
| CMC, in Ambergum ® 3021 | 10.0 | 10.0 | 10.0 |
| Sodium carbonate | 5.0 | — | — |
| Diammonium phosphate | — | 4.0 | 5.0 |
| Water | 75.0 | 76.0 | 75.0 |
| pH | 10.0 | 7.1 | 7.4 |
| Viscosity | 2400 | 2200 | 2000 |
| Wt. % polysaccharide | 20.0 | 20.0 | 20.0 |

Example 5
HPC Suspended in HEC Solution

This example describes the preparation of a MPS containing a HPC and a low-MW HEC. Success in preparing such a MPS indicates that the dissolved polymer in a MPS does not have to be ionic in nature.

The procedure of preparation was the same as that described in Example 1. The HEC used had a solution viscosity of ca. 1000 cPs at a polymer concentration of 30 wt. %. Both the HEC and HPC are available from Aqualon.

TABLE 5

| Suspension of HPC in Solution of a Low-MW HEC | |
|---|---|
| | 5-A |
| HPC, Klucel ® HXF | 10.0 |
| HEC, in AQU-D3097 | 20.0 |
| Sodium carbonate | 2.0 |
| Methyl parasept | 0.1 |
| Water | 67.9 |
| pH | 8.9 |
| Viscosity, (mPa.s) | 2400 |
| Wt. % polysaccharide | 30.0 |

Example 6
Two Nonionic Cellulosic Polymers Suspended in CMC Solution

It is possible to have two nonionic cellulosic polymers suspended in a solution of a low-MW cellulosic polymer. The compositions shown in Table 6 are examples of such terpolymer MPSs. These compositions, in general, contained a HMHEC and a MC or MC derivative in the dispersed phase and a low-MW CMC (such as Ambergum ® 1570) in the aqueous phase. The procedure for the preparation of these suspensions was similar to that of Example 1. The DNcPs were added to the aqueous CMC solution in sequence before the addition of the defoamer.

TABLE 6

| MPSs Containing Two DNcPs and One Dissolved Polymer | | | | |
|---|---|---|---|---|
| | 6-A | 6-B | 6-C | 6-D |
| HMHEC, Natrosol ® Plus | 10.0 | 10.0 | 10.0 | 10.0 |
| MC, Culminal ® 400* | 5.0 | — | — | — |
| MHEC, Culminal ® C3033* | — | 8.0 | — | — |
| MHPC, Culminal ® 6000PR | — | — | 5.0 | 5.0 |
| CMC, in Ambergum ® 1570 | 7.0 | 7.0 | 7.0 | 7.0 |
| Sodium carbonate | 6.0 | 6.5 | 6.0 | — |
| Diammonium phosphate | — | — | — | 8.0 |
| Hercules DF 285 | 0.3 | 0.3 | 0.3 | 0.3 |
| Methyl Parasept | 0.1 | 0.1 | 0.1 | 0.1 |
| Water | 71.6 | 68.2 | 71.6 | 69.6 |
| pH | 10.1 | 9.8 | 9.9 | 7.6 |
| Viscosity | 5800 | 11600 | 5300 | 5700 |
| Wt. % polysaccharide | 22.0 | 25.0 | 22.0 | 22.0 |

*The dry polymer products were ground in the laboratory to give finer particles to reduce settling of the suspended particles.

Example 7
HMHEC Suspended in Low-MW Guar Derivative

A depolymerized, low-MW guar derivative, a carboxymethylated guar (CM guar) in this example, has been used to suspend a HMHEC with the aid of 6 parts of sodium carbonate. This example manifests that the dissolved polymer is not necessarily limited to cellulosic derivatives.

The low-MW CM guar is available from Aqualon as a solution product (AQU-D3144). At a CM guar concentration of 34 wt. %, this aqueous solution had a Brookfield viscosity of 220 cPs.

TABLE 7

MPS Containing a Low-MW CM Guar as the Dissolved Polysaccharides

|  | 7-A |
|---|---|
| HMHEC, Natrosol ® Plus 330 | 10.0 |
| CM guar, in AQU-D3144 | 10.0 |
| Sodium carbonate | 6.0 |
| Hercules DF 285 | 0.2 |
| Methyl parasept | 0.1 |
| Water | 73.7 |
| pH | 9.6 |
| Viscosity | 700 |
| Wt. % polysaccharide | 20.0 |

Example 8

HMHEC Suspended in Starch Solution

This example describes the use of another non-cellulosic polysaccharide as the dissolved polymer, a low-MW, cationic starch manufactured by American Maize (Amaizo ®°2187). To prepare this suspension, a stock solution of the cationic starch (a dry product) was first prepared using a steam cooker. Make-up water and the salt were added to the stock solution, followed by the addition of the DNCP, a HMHEC.

TABLE 8

HMHEC Suspended in Starch Solution

|  | 8-A |
|---|---|
| HMHEC, Natrosol ® Plus 330 | 10.0 |
| Cationic starch, Amaizo ® 2187 | 14.3 |
| Sodium carbonate | 4.3 |
| Methyl parasept | 0.1 |
| Water | 71.3 |
| pH | 9.9 |
| Viscosity | 4200 |
| Wt. % polysaccharide | 24.3 |

Example 9

Use of MPSs as Thickener/Co-Binders for Paper Coatings

This example demonstrates the use of two types of MPSs as thickeners/co-binders in paper coating formulating. One type of MPS contains HMHEC and CMC. The other contains HMHEC, CMC and MHEC.

HMHEC/CMC MPS

Associative thickeners (i.e., hydrophobically modified cellulose ethers which associate with themselves) are useful in the practice of the present invention, providing improved rheology in paper coating compositions applied with a metering blade, rod or air knife. They provide high thickening efficiency with high pseudoplasticity in high solids content coating compositions. During blade coating a hydrophobically modified cellulosic allows lower blade pressures to be used with a resulting improvement in coating quality at high speeds. Lower blade pressure resulting from the use of associative thickeners can reduce water loss to the paper stock, web breaking and streaking, particularly at high coating speed. However, when a HMHEC is used as the sole thickener/co-binder in a clay-containing coating formulation, its highly clay adsorbing nature often results in a relatively low aqueous liquid viscosity, and hence a somewhat limited water retention capability.

The coating containing MPS 2-A has been found to give good runnability at a high coating speed of 4500 feet per minute in a coater trial using a cylindrical laboratory coater (CLC). A fairly low coat weight of ca. 5.0 pounds per 3300 sq. ft of paper was readily attained at this high speed with a moderate blade pressure, indicating a low and manageable flow resistance of the coating. The paper sample produced with MPS 2-A was observed to have improved coated paper properties over that of the coating containing only HMHEC or CMC. As shown in Table 11, MPS 2-A gave the best combination of sheet gloss, print gloss, opacity, and ink pick strength. The Test Methods section gives a more detailed description of these measurements.

The above data show that a MPS containing HMHEC and CMC not only can satisfy the industry's need for a liquid product, but also can lead to improved runnability and/or coated paper quality. A MPS has additional advantages in that (1) the presence of more than one cellulosic polymer makes it possible to optimize coating properties for a large variety of paper products, and (2) the use of a relatively low level of salt in the MPS avoids excessive flocculation of pigments or the latex binder, which may occur with high salt suspensions.

HMHEC/MHEC/CMC MPS

It has been found that a terpolymer MPS comprising of a HMHEC, a MC or MC derivative such as MHEC, and a low-MW CMC can also be an very effective thickener/co-binder for paper coatings. The MC derivative, which is a good binder and water retention aid, can work in combination with the HMHEC and CMC to provide good wet coating runnability and coated paper quality. For example, one such MPS (MPS 6-B) has been found to give a good balance of thickening efficiency, high shear viscosity and water retention in coating Formulation II (see Table 10).

The terpolymer MPS has been observed in a CLC coater trial to give good high speed runnability and coating properties. As shown in Table 11, the coated paper sample prepared with MPS 6-B showed clearly superior coated paper properties over that of another sample produced using a commercial CMC. The use of MPS 6-B as the thickener/co-binder has caused a substantial improvement in the ink pick resistance. This improvement in coating strength is thought to arise, at least in part, from the excellent binding property of the MC derivative.

Preferred Product

MPSs 2-A to 2-D and MPSs 6-A to 6-D are the preferred products for use as paper coating thickeners/co-binders.

TABLE 9

Paper Coating Formulations*

|  | I | II |
|---|---|---|
| Hydrafine ® | 100 | — |
| Hydrasperse ® | — | 40 |
| Hydraprint ® | — | 50 |
| Ansilex ® 93 | — | 5 |
| Ti-Pure ® R-931 | — | 5 |
| Dispex ® N40 | — | 0.15 |
| Dow 620 | 13 | 7 |
| Flowco ® 501 | 0.5 | — |
| Hercules 831 | 0.2 | 0.2 |
| Thickener | varied | varied |
| Brookfield Viscosity | 2300 | 1000 |

*All ingredients in the test formulas were on a dry or 100% active basis. The concentration of the ingredients were reported in parts per 100 parts of pigment; pH of

TABLE 9-continued the coating was adjusted to 8; Total solids was 60% by weight; The use level of thickener was varied to obtain the target Brookfield viscosity as measured at 100 rpm.

| | |
|---|---|
| Hydrafine: | Pigment, No. 1 kaolin clay, J. M. Huber Corp. |
| Hydrasperse: | Pigment, No. 2 kaolin clay, J. M. Huber Corp. |
| Hydraprint: | Pigment, delaminated clay, J. M. Huber Corp. |
| Ansilex 93: | Pigment, calcined clay, Engelhard Corp. |
| Ti-Pure R-931: | Pigment, $TiO_2$, DuPont |
| Dow 620: | Binder, styrene-butadiene latex, Dow Chemical Co. |
| Flowco ® 501: | Lubricant, calcium stearate dispersion, Mallinckroft |
| Hercules 831: | Defoamer, Hercules Incorporated |

TABLE 10

| Thickener | Properties of Wet Coatings | | |
|---|---|---|---|
| | Dose* | Hercules* | MRT* |
| (Formula I) | | | |
| HMHEC | 0.5 | 31.9 | 6 |
| CMC, low MW (7LT) | 2.0 | 65.2 | 14 |
| MPS 2-A | 1.0 | 43.7 | 11 |
| (Formula II) | | | |
| HMHEC | 0.4 | 38.9 | 5 |
| CMC, low MW | 0.8 | 69.5 | 16 |
| MPS 6-B | 0.6 | 58.4 | 8 |

*Dose: Parts per hundred parts of pigment.
Hercules: Hercules high shear viscosity in mPa.s.
WRT: Water Retention Time in seconds.

TABLE 11

| Coated Sheet Properties of Supercalendered Paper Samples* | | | | |
|---|---|---|---|---|
| Thickener | Gloss | Opacity | IGT | Print Gloss |
| (Formula I) | | | | |
| CMC, low MW | 65.4 | 83.5 | 77.5 | 83.3 |
| HMHEC | 62.6 | 85.3 | 84.0 | 80.3 |
| MPS 2-A | 65.4 | 85.3 | 84.0 | 84.6 |
| (Formula II) | | | | |
| CMC, Low MW | 53.1 | 81.3 | 19.4 | 60.0 |
| MPS 6-B | 55.2 | 81.8 | 29.0 | 66.9 |

Test Methods

Kaltec Scientific, Inc., 22425 Heslip Drive, Novi, Mich. 48050 supplies parts and rheogram paper for use with the Model ET24-6 Hercules ® Hi-Shear Viscometer which is in common use by the paper industry for evaluation of coating compositions.

All paper samples were coated on one side using a cylindrical laboratory coater (manufactured by Sensor and Simulation Products, Tacoma, Wash.) at a speed of from 4000 to 4500 feet per minute. The coat weight for both formulations was approximately 5.0 pounds per 3300 square feet. The coated paper samples were supercalendered with four passes at 160° F. and 1500 psi.

Gloss of the paper samples was measured using a Gardner Glossmeter at 75° angle, and was reported as % reflectance of the incident light. The opacity was measured using a Diano Opacimeter according to TAPPI test method T-425. The IGT ink pick resistance was measured using a 32 Pa.s oil ink, and was reported as velocity-viscosity product at the onset of coating picking by the ink. A higher IGT pick resistance value indicates a higher coating strength which is desirable for high speed printing.

Water retention times of paper coatings were measured using a conductivity method which was a modification of the S. D. Warren Water Retention Test Method, i.e., J. C. Stichfield, R. A. Clift, J. J. Thomas, TAPPI, 41 (2), 1958, p. 77.

The CMC used in this test had a nominal molecular weight of approximately 110,000 (Brookfield viscosity of 2% solution was 40 mPa.s); this CMC product is commercially used as coating thickeners and is available from Aqualon Company.

What is claimed is:

1. An aqueous paper coating composition of clay, calcium carbonate and/or gypsum, a binder selected from the group consisting essentially of starch, protein and latex and thickener; characterized in that the thickener is a Muti-Polysaccharide Suspension (MPS) of dispersed particles of a nonionic hydrophobically modified cellulose ether selected from the group of hydroxyethylcellulose, ethylhydroxyethylcellulose, methylcellulose, hydroxypropylcellulose, methylhydroxypropylcellulose and methyl hydroxyethylcellulose in a continuous aqueous phase of a dissolved polysaccharide selected from the group of hydroxyethylcellulose, cationic starch, carboxymethylcellulose and carboxymethylguar wherein the polysaccharide is of sufficiently low molecular weight that a 15 weight percent solution will have a Brookfield viscosity at 12 rpm at room temperature of 10,000 mPa.s or lower and the MPS contains 10 percent by weight or less of a salt or salts from the group of sodium carbonate, potassium carbonate, sodium sulfate, diammonium phosphate and sodium formate and the MPS contains a stabilizing amount of xanthan wherein the MPS remains fluid and pourable.

2. The coating composition of claim 1 where the dispersed particles comprise hydrophobically modified hydroxyethylcellulose.

3. The coating composition of claim 2 where the low molecular weight polysaccharide is carboxymethylcellulose.

4. The coating composition of claim 3 further comprising one or more of methylcellulose, methylhydroxypropylcellulose or methylhydroxyethylcellulose.

* * * * *

UNITED STATES PATENT AND TRADEMARK OFFICE
CERTIFICATE OF CORRECTION

PATENT NO. : 5,080,717
DATED : January 14, 1992
INVENTOR(S) : T. S. Young It is certified that error appears in the above-identified patent and that said Letters Patent is hereby corrected as shown below:

Col. 1, line 34, "US. Pat. Nos. 4,834,207, 4,228,277 and 4,243,802" should read --U.S. Pat. Nos. 4,228,277 and 4,243,802--.

Col 3, line 56, "derivative" should read --derivatives--.

Col. 12, line 31, "methyl hydroxyethylcellulose" should read --methylhydroxyethylcellulose--.

Signed and Sealed this

Twenty-eighth Day of September, 1993

*Attest:*

BRUCE LEHMAN

*Attesting Officer*  Commissioner of Patents and Trademarks